(12) United States Patent
Duelm et al.

(10) Patent No.: US 9,957,821 B2
(45) Date of Patent: May 1, 2018

(54) GAS TURBINE ENGINE COMPOSITE AIRFOIL TRAILING EDGE

(71) Applicant: United Technologies Corporation, Hartford, CT (US)

(72) Inventors: Shelton O. Duelm, Wethersfield, CT (US); Michael G. McCaffrey, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 315 days.

(21) Appl. No.: 14/767,394

(22) PCT Filed: Feb. 12, 2014

(86) PCT No.: PCT/US2014/016056
§ 371 (c)(1),
(2) Date: Aug. 12, 2015

(87) PCT Pub. No.: WO2014/186011
PCT Pub. Date: Nov. 20, 2014

(65) Prior Publication Data
US 2015/0377046 A1    Dec. 31, 2015

Related U.S. Application Data

(60) Provisional application No. 61/771,607, filed on Mar. 1, 2013.

(51) Int. Cl.
*F01D 9/02*    (2006.01)
*F01D 5/28*    (2006.01)
(Continued)

(52) U.S. Cl.
CPC ............... *F01D 9/02* (2013.01); *F01D 5/28* (2013.01); *F01D 5/282* (2013.01); *F01D 5/284* (2013.01);
(Continued)

(58) Field of Classification Search
CPC .... F01D 9/02; F05D 2220/32; F05D 2230/30; F05D 2230/60
See application file for complete search history.

(56) References Cited

U.S. PATENT DOCUMENTS 3,892,612 A * 7/1975 Carlson .................. F01D 5/282
156/150
4,790,721 A * 12/1988 Morris .................... F01D 5/187
416/241 B (Continued)

OTHER PUBLICATIONS

International Search Report and Written Opinion for International Application No. PCT/US2014/016056 dated Dec. 11, 2014.
(Continued)

*Primary Examiner* — Mark Laurenzi
*Assistant Examiner* — Shafiq Mian
(74) *Attorney, Agent, or Firm* — Carlson, Gaskey & Olds, P.C.

(57) ABSTRACT

An airfoil for a gas turbine engine includes first pressure and suction side layers forming a cavity and terminating in ends near a trailing edge. The first and second suction side layers are constructed from a composite material. A bridge is wrapped about the ends.

19 Claims, 3 Drawing Sheets

(51) Int. Cl.
  *F01D 9/04* (2006.01)
  *F01D 9/06* (2006.01)
  *F01D 25/16* (2006.01)

(52) U.S. Cl.
  CPC .............. *F01D 5/286* (2013.01); *F01D 5/288* (2013.01); *F01D 9/041* (2013.01); *F01D 9/065* (2013.01); *F01D 25/162* (2013.01); *F05D 2220/32* (2013.01); *F05D 2230/30* (2013.01); *F05D 2230/60* (2013.01); *F05D 2240/12* (2013.01); *F05D 2300/2261* (2013.01); *F05D 2300/6033* (2013.01); *F05D 2300/614* (2013.01); *F05D 2300/615* (2013.01); *Y02T 50/672* (2013.01); *Y02T 50/673* (2013.01)

(56) References Cited

U.S. PATENT DOCUMENTS

| | | | |
|---|---|---|---|
| 5,375,978 A | | 12/1994 | Evans et al. |
| 5,382,453 A | * | 1/1995 | Mason .................. C04B 35/806 264/81 |
| 5,640,767 A | * | 6/1997 | Jackson .................. B23P 15/04 118/427 |
| 5,791,879 A | * | 8/1998 | Fitzgerald ............... F01D 5/147 416/229 A |
| 6,283,708 B1 | * | 9/2001 | Zelesky .................. F01D 5/189 416/97 R |
| 6,514,046 B1 | * | 2/2003 | Morrison ................ F01D 5/187 416/229 A |
| 6,709,230 B2 | | 3/2004 | Morrison et al. |
| 7,066,717 B2 | | 6/2006 | Morrison et al. |
| 7,255,535 B2 | * | 8/2007 | Albrecht ................. F01D 5/147 416/229 R |
| 7,258,530 B2 | | 8/2007 | Morrison et al. |
| 7,435,058 B2 | | 10/2008 | Campbell et al. |
| 7,510,379 B2 | | 3/2009 | Marusko et al. |
| 7,600,979 B2 | | 10/2009 | Steibel et al. |
| 8,403,626 B2 | * | 3/2013 | Hasselqvist ............. F01D 5/143 415/91 |
| 8,596,959 B2 | * | 12/2013 | Durocher ................ F01D 9/065 415/110 |
| 8,734,114 B2 | * | 5/2014 | McMillan ............. F04D 29/668 415/200 |
| 9,739,157 B2 | * | 8/2017 | Uskert .................... F01D 5/282 |
| 2001/0012568 A1 | | 8/2001 | Bose et al. |
| 2002/0155269 A1 | | 10/2002 | Holowczak et al. |
| 2003/0173460 A1 | * | 9/2003 | Chapman, Jr. ......... B29C 53/60 244/123.3 |
| 2003/0223861 A1 | * | 12/2003 | Morrison ................ F01D 5/189 415/115 |
| 2005/0076504 A1 | | 4/2005 | Morrison et al. |
| 2005/0238491 A1 | | 10/2005 | Morrison et al. |
| 2006/0285973 A1 | * | 12/2006 | Keller ..................... F01D 5/147 416/97 R |
| 2008/0124512 A1 | | 5/2008 | Steibel et al. |
| 2009/0014926 A1 | | 1/2009 | Marini |
| 2009/0165924 A1 | * | 7/2009 | Steibel .................... F01D 5/147 156/89.11 |
| 2012/0055609 A1 | | 3/2012 | Blanchard et al. |

OTHER PUBLICATIONS

Extended European Search Report for European Application No. 14798232.6 dated Oct. 14, 2016.
International Preliminary Report on Patentability for PCT Application No. PCT/US2014/016056, dated Sep. 11, 2015.

* cited by examiner

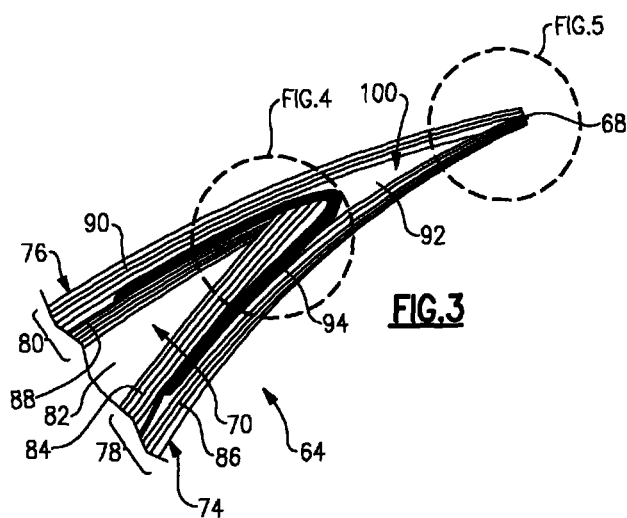
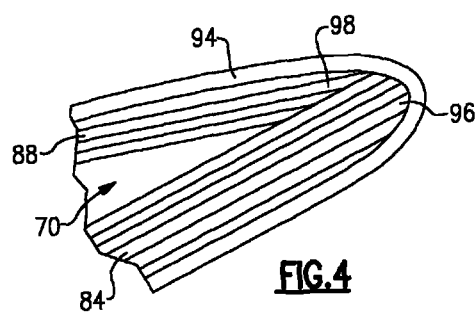
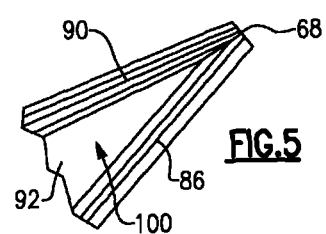

GAS TURBINE ENGINE COMPOSITE AIRFOIL TRAILING EDGE

BACKGROUND

This disclosure relates to a gas turbine engine, and more particularly to composite airfoil trailing edge structure.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

A mid turbine frame is provided between the high and low pressure turbine sections. One type of turbine frame is constructed from a composite material, which is difficult to manufacture. It is desirable to have a small trailing edge radius for aerodynamic performance but as a result, a continuous layer of plies cannot be used at the trailing edge. Instead, the plies terminate at ends that are joined at the trailing edge.

Typically, components are passed through some of the mid turbine frame airfoils. There is a significant differential pressure from the interior of the mid turbine frame to its exterior. As a result of the differential pressure across the airfoil wall, the trailing edge, in particular around the suction side, will tend to bulge open and split the trailing edge.

SUMMARY

In one exemplary embodiment, an airfoil for a gas turbine engine includes first pressure and suction side layers forming a cavity and terminating in ends near a trailing edge. The first and second suction side layers are constructed from a composite material. A bridge is wrapped about the ends.

In a further embodiment of the above, the second pressure and suction side layers adjoin the first pressure and suction side layers, respectively. The bridge is arranged between the first layers and the second layers.

In a further embodiment of any of the above, a space is arranged between the bridge and the second pressure and suction side layers. A filler is provided in the space.

In a further embodiment of any of the above, the second pressure and suction side layers are arranged in a V-shape to provide the trailing edge.

In a further embodiment of any of the above, each layer includes multiple plies.

In a further embodiment of any of the above, the plies are constructed from ceramic fibers bonded to one another by a ceramic matrix to form a ceramic matrix composite.

In a further embodiment of any of the above, the ceramic matrix composite is a silicon carbide material.

In a further embodiment of any of the above, the ends are arranged in a V-shape.

In a further embodiment of any of the above, the bridge is C-shaped.

In a further embodiment of any of the above, the airfoil is a vane.

In a further embodiment of any of the above, the vane is a mid turbine frame vane.

In another exemplary embodiment, a method of forming an airfoil includes wrapping first pressure and suction side layers about the mandrel and wrapping a bridge around the ends of the first pressure and suction side layers. The method also includes applying a filler over the bridge near a trailing edge and wrapping second pressure and suction side layers around the first pressure and suction side layers and the filler.

In a further embodiment of the above, the method includes the steps of placing the layers, bridge and the filler as an assembly in a mold, and applying heat to the assembly.

In a further embodiment of any of the above, the method includes the step of removing the mandrel from the assembly to provide a cavity.

In a further embodiment of any of the above, the second pressure and suction side layers are arranged in V-shape to provide the trailing edge.

In a further embodiment of any of the above, the bridge is C-shaped.

In a further embodiment of any of the above, each layer includes multiple plies.

In a further embodiment of any of the above, the plies are constructed from ceramic fibers bonded to one another by a ceramic matrix to form a ceramic matrix composite.

In a further embodiment of any of the above, the ceramic matrix composite is a silicon carbide material.

BRIEF DESCRIPTION OF THE DRAWINGS

The disclosure can be further understood by reference to the following detailed description when considered in connection with the accompanying drawings wherein:

FIG. 2 schematically illustrates a mid turbine frame.

FIG. 3 is a cross-sectional view through a trailing edge portion of the mid turbine airfoil shown in FIG. 2 taken along line 3-3.

FIG. 4 is an enlarged view of the trailing edge portion in the area indicated in FIG. 3.

FIG. 5 is an enlarged view of the trailing edge as indicated in FIG. 3.

DETAILED DESCRIPTION

Figure 1:
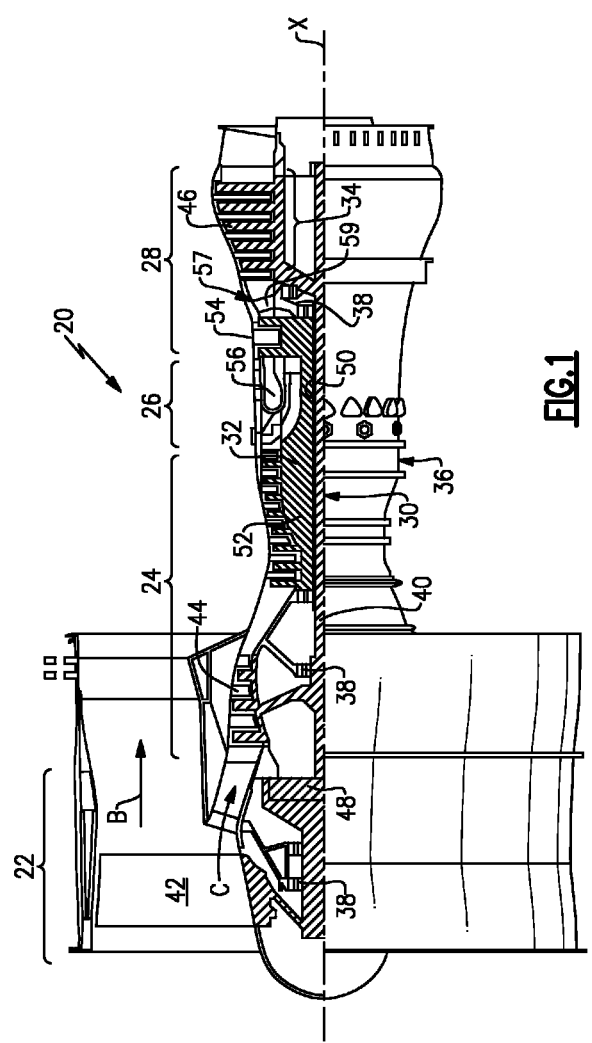
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram} \,°\text{R})/518.7]^{0.5}$. The "Low corrected fan tip speed", as disclosed herein according to one non-limiting embodiment, is less than about 1150 ft/second.

Figure 2:
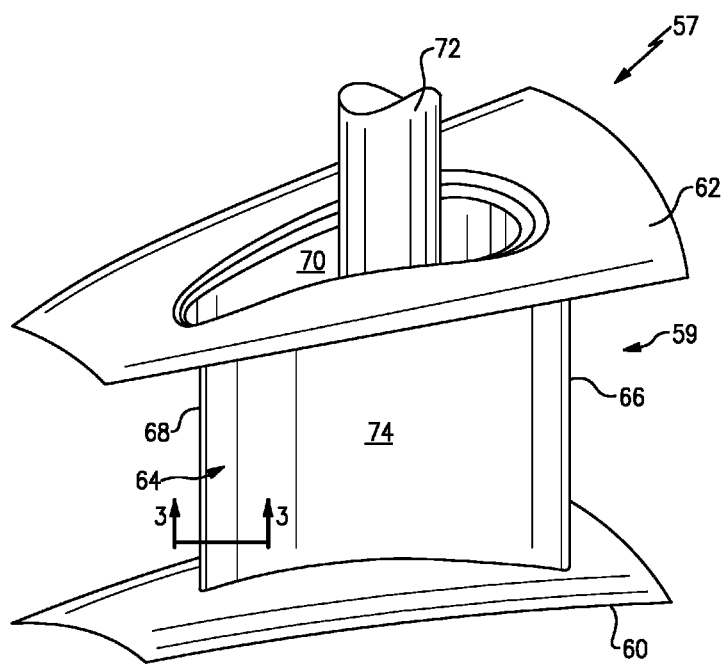
FIG. 2 is a perspective view of a mid turbine frame airfoil.

FIG. 2 illustrates the mid turbine frame 57 in more detail. The mid turbine frame 57 includes inner and outer platforms 60, 62 spaced apart from one another and joined to one another by an airfoil 64 that provides the vane 59. The vanes 59 may be discrete from one another or provided in clusters.

The airfoil 64 includes leading and trailing edges 66, 68 axially spaced apart from one another and joined by pressure and suction sides 74, 76.

The mid turbine frame 57 typically includes a cavity 70 that passes through the airfoil 64 from the outer platform 62 to the inner platform 60. One or more components 72, such as wiring, oil lines and/or bleed air lines, for example, are provided within the cavity 70. It is desirable to provide as large of a cavity 70 as possible to accommodate these components.

In one example, the airfoil 64 is constructed from a ceramic matrix composite (CMC) material. A Resin transfer molding or a chemical vapor infiltration process may be used to manufacture the airfoil. The CMC material typically includes layers provided by multiple plies wrapped about a mandrel during the forming process. The adjoining plies and layers, which are constructed from a silicon carbide material, for example, are adhered to one another using a resin or sticky binder for the purpose of holding the plies together during assembly. The layers are generally continuous from the trailing edge on the pressure side, wrapping around the leading edge, to the trailing edge on the suction side.

Referring to FIG. 3, pressure and suction side wall 78, 80 are formed about a mandrel 82. In one example, the pressure side wall 78 is provided by first and second pressure side layers 84, 86; the suction side wall 80 is provided by first and second suction side layers 88, 90. The first layers 84, 88 terminate in ends 96, 98. The second layers 86, 90 extend all the way to the trailing edge 68, which is shown in more detail in FIG. 5 and terminates in ends that are arranged in a V-shape and bonded to one another.

A filler material 92 is provided between the first pressure and suction side layers 84, 88 and the second pressure and suction side layers 86, 90 that provide the trailing edge 68. The filler may be constructed from any suitable material, such as stacked fibers, unidirectional material, laid up fabric, chopped fibers, a monolithic structure, resin or any other suitable material in configuration that it conforms to a space 100 between the layers 84-90.

As best shown in FIG. 4, the first pressure and suction side layers 84, 88 include a bridge materials 94 wrapped about ends 96, 98 of the first pressure and suction side layers 84, 88, which are arranged in a V-shape. The bridge 94 adjoins and separates at least portions of the first layers from the second layers. The bridge 94 may be a CMC material, such as silicon carbide, for example, and constructed from several plies.

The C-shaped bridge 94 holds the ends 96, 98 together under the differential pressure across the airfoil 64. In particular, the cavity 70 is typically at a significantly higher pressure than the exterior of the airfoil 64. The bridge 94 holds the ends 96, 98 together and resists splitting at this joint. The bridge 94 may be a single layer or may include multiple layers. Moreover, the bridge 94 may have a uniform thickness or a variable thickness.

The layers wrapped about the mandrel 82 are then placed in a mold and heated, as is known. In one example, the first pressure and suction side layers 84, 88 are wrapped about the mandrel 82. The bridge 94 is wrapped around the ends 96, 98. Filler 92 is applied over the bridge 94, and the second pressure and suction side layers 86, 90 are wrapped around the first pressure and suction side layers 84, 88 and the filler 92.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for a gas turbine engine comprising:
   first pressure and suction side layers forming a cavity and terminating in ends near a trailing edge, the ends of the first pressure and suction side layers joined to one another forming a V-shaped joint, the first pressure side and suction side layers constructed from a composite material; and
   a bridge wrapped about the ends to cover the V-shaped joint, the bridge extending beyond the ends in a V-shape to hold the ends together.

2. The airfoil according to claim 1, comprising second pressure side and suction side layers adjoining the first pressure side and suction side layers, respectively, the bridge arranged between the first pressure side and suction side layers and the second pressure side and suction side layers.

3. The airfoil according to claim 1, wherein each layer of the first pressure side and suction side layers includes multiple plies.

4. The airfoil according to claim 3, wherein plies of the multiple plies are constructed from ceramic fibers bonded to one another by a ceramic matrix to form a ceramic matrix composite.

5. The airfoil according to claim 4, wherein the ceramic matrix composite is a silicon carbide material.

6. The airfoil according to claim 1, wherein the ends are arranged in a V-shape.

7. The airfoil according to claim 1, wherein the bridge is C-shaped.

8. The airfoil according to claim 1, wherein the airfoil is a vane.

9. The airfoil according to claim 8, wherein the vane is a mid turbine frame vane.

10. The airfoil according to claim 2, wherein the second pressure side and suction side layers are arranged in V-shape to form the trailing edge.

11. An airfoil for a gas turbine engine comprising:
    first pressure side and suction side layers forming a cavity and terminating in ends near a trailing edge, the first pressure side and suction side layers constructed from a composite material;
    a bridge wrapped about the ends;
    second pressure side and suction side layers adjoining the first pressure side and suction side layers, respectively, the bridge arranged between the first pressure side and suction side layers and the second pressure side and suction side second layers; and
    a space arranged between the bridge and the second pressure side and suction side layers, and a filler provided in the space.

12. A method of forming an airfoil comprising:
    wrapping first pressure side and suction side layers about a mandrel, ends of the first pressure side and suction side layers joined to one another forming a V-shaped joint;
    wrapping, a bridge around the ends of the first pressure side and suction side layers to cover the V-shaped joint, the bridge extending beyond the ends in a V-shape to hold the ends together;
    applying a filler over the bridge near a trailing edge; and
    wrapping second pressure side and suction side layers around the first pressure side and suction side layers and the filler.

13. The method according to claim 12, comprising a step of placing the first pressure side and suction side layers, the second pressure side and suction side layers, bridge and the filler as an assembly in a mold, and applying heat to the assembly.

14. The method according to claim 13, comprising a step of removing the mandrel from the assembly to provide a cavity.

15. The method according to claim 12, wherein the second pressure side and suction side layers are arranged in V-shape to form the trailing edge.

16. The method according to claim 12, wherein the bridge is C-shaped.

17. The method according to claim 12, wherein each layer of the first pressure side and suction side layers includes multiple plies.

18. The method according to claim 17, wherein plies of the multiple plies are constructed from ceramic fibers bonded to one another by a ceramic matrix to form a ceramic matrix composite.

19. The method according to claim 18, wherein the ceramic matrix composite is a silicon carbide material.

* * * * *